(12) United States Patent
Gomi et al.

(10) Patent No.: US 12,217,622 B2
(45) Date of Patent: Feb. 4, 2025

(54) DIRECTION PRESENTATION APPARATUS, DIRECTION PRESENTATION METHOD, AND PROGRAM

(71) Applicant: NIPPON TELEGRAPH AND TELEPHONE CORPORATION, Tokyo (JP)

(72) Inventors: Hiroaki Gomi, Tokyo (JP); Ryoma Tanase, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 585 days.

(21) Appl. No.: 17/617,972

(22) PCT Filed: Jun. 12, 2019

(86) PCT No.: PCT/JP2019/023257
§ 371 (c)(1),
(2) Date: Dec. 10, 2021

(87) PCT Pub. No.: WO2020/250336
PCT Pub. Date: Dec. 17, 2020

(65) Prior Publication Data
US 2022/0254277 A1 Aug. 11, 2022

(51) Int. Cl.
*G09B 21/00* (2006.01)
*H04N 7/18* (2006.01)

(52) U.S. Cl.
CPC ............. *G09B 21/003* (2013.01); *H04N 7/18* (2013.01)

(58) Field of Classification Search
CPC .......... G09B 21/003; A61H 2003/063; A61H 3/061; A61H 2201/0153; A61H 2201/5092; H04N 7/18
See application file for complete search history.

(56) References Cited

U.S. PATENT DOCUMENTS

| 7,991,576 B2* | 8/2011 | Roumeliotis | G01C 21/12 702/158 |
| 8,988,348 B2 | 3/2015 | Tsukahara et al. | |

(Continued)

FOREIGN PATENT DOCUMENTS

| JP | 2009156660 A | 7/2009 |
| JP | 2012128617 A | 7/2012 |

(Continued)

OTHER PUBLICATIONS

Tomohiro Amemiya (2014) "Buru-Navi3: Behavioral Navigations Using Illusory Pulled Sensation Created by Thumb-sized Vibrator", In Proc. of ACM SIGGRAPH 2014 Emerging Technologies, Vancouver, Canada, Aug. 2014.

(Continued)

*Primary Examiner* — Boubacar Abdou Tchoussou

(57) ABSTRACT

To provide a technique for presenting a guided person with a direction in consideration of a relative orientation of a force sense presentation device with respect to an orientation of a camera. A direction presentation apparatus includes an instructed direction calculating unit which calculates, using a first angle in an external coordinate system representing an orientation of a camera that takes an image in front of a guided person and a second angle in the external coordinate system representing an orientation of a force sense presentation device that presents the guided person with a predetermined direction, an instructed force sense vector (hereinafter, referred to as a second instructed force sense vector) in a force sense presentation device coordinate system representing a direction to be instructed to the force sense presentation device from an instructed force sense vector (hereinafter, referred to as a first instructed force sense vector) in a camera coordinate system representing the (Continued)

direction to be instructed to the force sense presentation device.

8 Claims, 5 Drawing Sheets

(56) References Cited

U.S. PATENT DOCUMENTS

| | | | |
|---|---|---|---|
| 10,765,588 | B2 | 9/2020 | Yashiro et al. |
| 2016/0321880 | A1* | 11/2016 | Hamam ............ H04M 1/72481 |
| 2017/0254662 | A1 | 9/2017 | Takenaka et al. |
| 2018/0356227 | A1* | 12/2018 | Kim ........................ G01V 1/38 |
| 2019/0011280 | A1 | 1/2019 | Takenaka et al. |
| 2019/0307632 | A1* | 10/2019 | Yashiro ................ G06V 10/757 |

FOREIGN PATENT DOCUMENTS

| | | |
|---|---|---|
| WO | 2016/031118 A1 | 3/2016 |
| WO | 2018/025531 A1 | 2/2018 |

OTHER PUBLICATIONS

Lee, Y.H., Medioni, G. (2015) "Wearable RGBD Indoor Navigation System for the Blind" In: Agapito, L., Bronstein, M., Rother, C. (eds) Computer Vision—ECCV 2014 Workshops. ECCV 2014. Lecture Notes in Computer Science(), vol. 8927. Springer, Cham. https://doi.org/10.1007/978-3-319-16199-0_35.

* cited by examiner

DIRECTION PRESENTATION APPARATUS, DIRECTION PRESENTATION METHOD, AND PROGRAM

CROSS-REFERENCE TO RELATED APPLICATIONS

This application is a U.S. National Stage Application filed under 35 U.S.C. § 371 claiming priority to International Patent Application No. PCT/JP2019/023257, filed on 12 Jun. 2019, the disclosure of which is hereby incorporated herein by reference in its entirety.

TECHNICAL FIELD

The present invention relates to a technique for presenting a direction to a guided person using a force sense presentation device.

BACKGROUND ART

An intuitive presentation of a walking direction using a force sense presentation device is considered effective in pedestrian navigation of a non-native speaker or a visually impaired person (hereinafter, referred to as a guided person) (NPL 1). In this case, a force sense presentation device refers to a device that provides a person grasping the device with a force sense itself or a stimulus (for example, a stimulus based on vibration) causing the person to perceive the force sense in a simulated manner.

CITATION LIST

Non Patent Literature

[NPL 1] Tomohiro Amemiya, Hiroaki Gomi, "Buru-Navi3: Behavioral Navigations Using Illusory Pulled Sensation Created by Thumb-sized Vibrator", In Proc. of ACM SIGGRAPH 2014 Emerging Technologies, Vancouver, Canada, August 2014.

SUMMARY OF THE INVENTION

Technical Problem

When presenting a guided person with a walking direction or a direction to which the guided person's attention is desirably directed, for example, a guide at a remote location conceivably instructs the direction with respect to a force sense presentation device being grasped by the guided person via communication while viewing a video of a live camera taking an image in front of the guided person (for example, a video taken by a camera mounted to a smartphone). In this case, since a direction in which the camera is facing and a direction in which the force sense presentation device is facing do not necessarily coincide with each other, the direction to be instructed with respect to the force sense presentation device must be determined in consideration of a relative orientation of the force sense presentation device with respect to an orientation of the camera. However, it is difficult to measure the relative orientation of the force sense presentation device with respect to the orientation of the camera in a simple manner.

In consideration thereof, an object of the present invention is to provide a technique for presenting a guided person with a direction in consideration of a relative orientation of a force sense presentation device with respect to an orientation of a camera.

Means for Solving the Problem

An aspect of the present invention includes an instructed direction calculating unit which calculates, using a first angle in an external coordinate system representing an orientation of a camera that takes an image in front of a guided person and a second angle in the external coordinate system representing an orientation of a force sense presentation device that presents the guided person with a predetermined direction, an instructed force sense vector (hereinafter, referred to as a second instructed force sense vector) in a force sense presentation device coordinate system representing a direction to be instructed to the force sense presentation device from an instructed force sense vector (hereinafter, referred to as a first instructed force sense vector) in a camera coordinate system representing the direction to be instructed to the force sense presentation device.

An aspect of the present invention includes an instructed direction calculating unit which calculates, using a first vector that is an azimuth vector in a camera coordinate system corresponding to a first azimuth in an external coordinate system, a second vector that is an azimuth vector in a force sense presentation device coordinate system corresponding to a second azimuth in the external coordinate system, a third vector in the camera coordinate system representing an orientation of gravitational force being applied to the camera, a fourth vector in the force sense presentation device coordinate system representing an orientation of gravitational force being applied to the force sense presentation device, a first angle in the external coordinate system representing an orientation of the camera, and a second angle in the external coordinate system representing an orientation of the force sense presentation device, an instructed force sense vector (hereinafter, referred to as a second instructed force sense vector) in the force sense presentation device coordinate system representing a direction to be instructed to the force sense presentation device from an instructed force sense vector (hereinafter, referred to as a first instructed force sense vector) in the camera coordinate system representing the direction to be instructed to the force sense presentation device.

Effects of the Invention

According to the present invention, a guided person can be presented with a direction in consideration of a relative orientation of a force sense presentation device with respect to an orientation of a camera.

DESCRIPTION OF EMBODIMENTS

Embodiments of the present invention will be described in detail below. It should be noted that a constituent unit having a same function will be denoted by a same numeral and a redundant description will be omitted.

Figure 1:
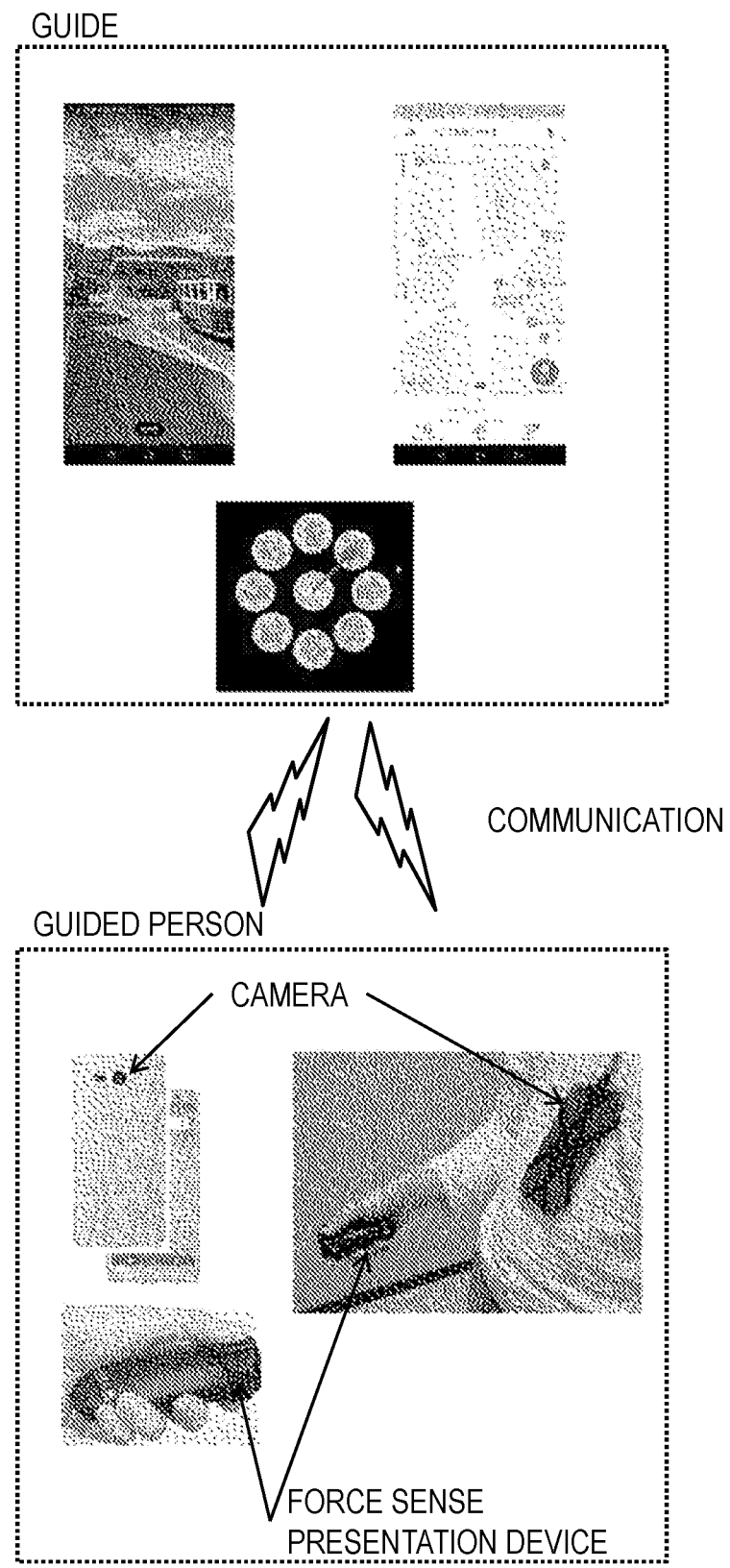
FIG. 1 is a diagram showing an example of a pedestrian navigation system.

FIG. 1 is a diagram showing an example of a pedestrian navigation system. A guided person walks around town carrying a smartphone and grasping a force sense presentation device. The force sense presentation device guides the guided person in a predetermined walking direction using a force sense or a stimulus that causes the force sense to be perceived in a simulated manner which the force sense presentation device imparts to the guided person. On the other hand, video taken by a camera of the smartphone or position information of the smartphone is displayed on a terminal that is operated by a guide and the guide issues an instruction related to the walking direction of the guided person while viewing the video or the position information.

In order to enable the guide to accurately issue an instruction related to the walking direction, a relative orientation of the force sense presentation device with respect to an orientation of the camera must be accurately comprehended. For this purpose, first, the orientation of the camera and the orientation of the force sense presentation device are respectively acquired using a geomagnetic sensor attached to the camera and a geomagnetic sensor attached to the force sense presentation device. In addition, in consideration of a relative orientation of the force sense presentation device with respect to the orientation of the camera calculated using the acquired orientations, a direction which the force sense presentation device causes the guided person to perceive using a force sense or a stimulus that causes the force sense to be perceived in a simulated manner is determined.

In other words, by calculating a relative azimuth from respective azimuths relative to an external space as measured by the geomagnetic sensor attached to the camera and the geomagnetic sensor attached to the force sense presentation device, the relative orientation of the force sense presentation device with respect to the orientation of the camera is obtained and used to guide the guided person in a predetermined walking direction. Accordingly, regardless of which direction the force sense presentation device is facing relative to the orientation of the camera, by designating an instructed direction with the orientation of the camera as a reference, a direction which the force sense presentation device causes the guided person to perceive can be obtained.

In addition, for example, while an azimuth obtained from a geomagnetic sensor may contain an error at locations with geomagnetic distortion such as an indoor space, since the azimuths obtained from the geomagnetic sensors of both the camera and the force sense presentation device contain errors in roughly equal measure, an error is not created in the relative azimuth and the walking direction of the guided person can be accurately guided.

When horizontal angle detection of the force sense presentation device is performed at the same time but the horizontal angle of the device is not within an acceptable range, the guided person may be prompted to keep the horizontal angle of the force sense presentation device in the acceptable range by concomitantly using means to notify the guided person that the horizontal angle is not within the acceptable range by an alarm sound, an alarm vibration, or the like.

In addition, by further combining gravity sensors that measure gravitation forces acting on the camera and the force sense presentation device, guidance of the walking direction of the guided person can also be realized in a three-dimensional space.

First Embodiment

A direction presentation apparatus 100 is an apparatus for presenting a guided person with a predetermined direction in real-time and is operated by a guide. In this case, the predetermined direction refers to a direction in which walking of the guided person is to be guided or a direction in which attention of the guided person is to be directed.

Figure 2:
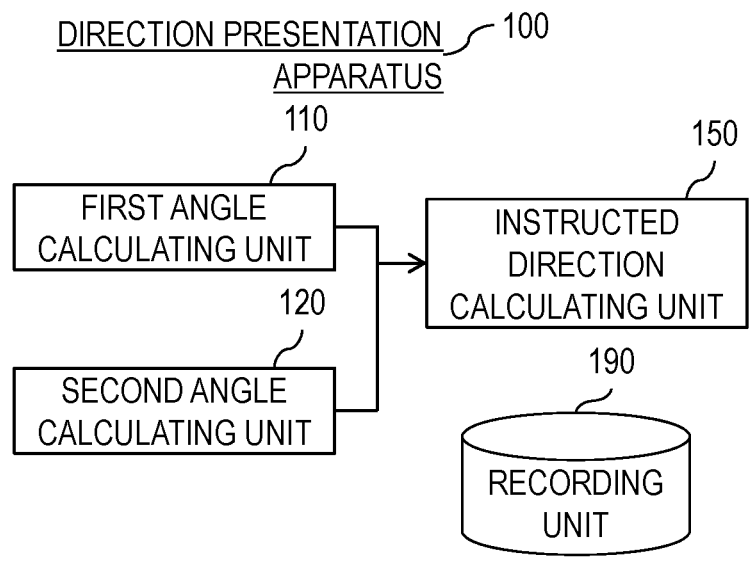
FIG. 2 is a block diagram showing an example of a configuration of a direction presentation apparatus 100.
Figure 3:
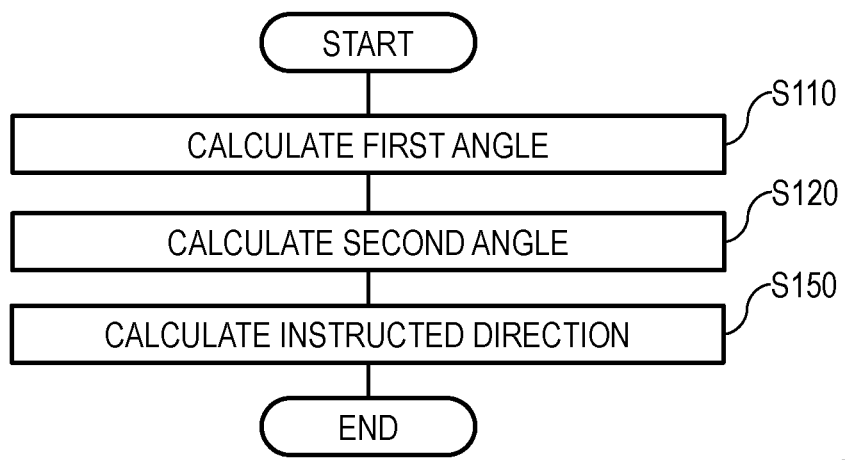
FIG. 3 is a flow chart showing an example of operations of the direction presentation apparatus 100.

Hereinafter, the direction presentation apparatus 100 will be described with reference to FIGS. 2 and 3. FIG. 2 is a block diagram showing a configuration of the direction presentation apparatus 100. FIG. 3 is a flow chart showing operations of the direction presentation apparatus 100. As shown in FIG. 2, the direction presentation apparatus 100 includes a first angle calculating unit 110, a second angle calculating unit 120, an instructed direction calculating unit 150, and a recording unit 190. The recording unit 190 is a constituent unit that records information necessary for processing by the direction presentation apparatus 100 when appropriate.

Figure 4:
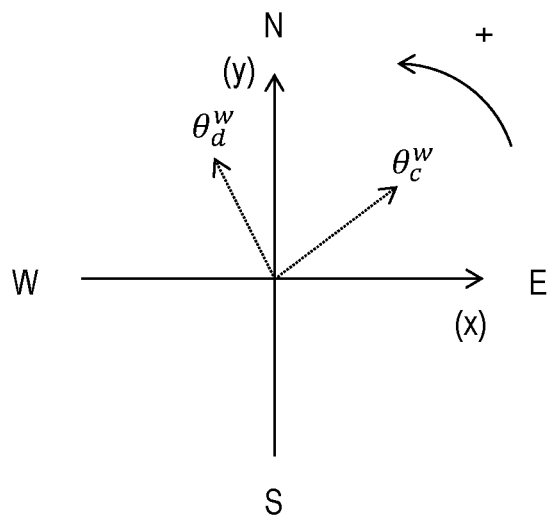
FIG. 4 is a diagram showing an example of external coordinates.

Hereinafter, operations of the direction presentation apparatus 100 will be described with reference to FIG. 3. In S110, using data related to an orientation of a camera that takes an image in front of the guided person as input, the first angle calculating unit 110 calculates a first angle in an external coordinate system that represents the orientation of the camera from the data and outputs the first angle. In this case, the data related to the orientation of the camera that takes an image in front of the guided person is, for example, data acquired using a geomagnetic sensor that is attached to a camera of a smartphone being carried by the guided person. The direction presentation apparatus 100 that is situated at a different point from the guided person receives the data via a communicating unit (not illustrated) and inputs the data to the first angle calculating unit 110. As the data related to the orientation of the camera that takes an image in front of the guided person, a direction angle of the camera in the external coordinate system can be used, in which case the direction angle can be adopted as the first angle. In addition, the external coordinates refer to two-dimensional coordinates capable of representing north, south, east and west and FIG. 4 represents an example thereof. In FIG. 4, E, W, S, and N respectively represent east, west, south, and north. Coordinates shown in FIG. 4 are coordinates having an east-west direction as an x axis, a north-south direction as a y axis, a direction facing east as a positive direction of the x axis, and a direction facing north as a positive direction of the y axis, and the direction facing east is assumed to be 0 deg.

In S120, using data related to an orientation of a force sense presentation device that presents the guided person with a predetermined direction as input, the second angle calculating unit 120 calculates a second angle in the external coordinate system that represents the orientation of the force sense presentation device from the data and outputs the second angle. In this case, the predetermined direction refers to a direction in which walking of the guided person is to be guided or a direction in which attention of the guided person is to be attracted. In addition, the data related to the orientation of the force sense presentation device that presents the guided person with the predetermined direction is, for example, data acquired using a geomagnetic sensor that is attached to the force sense presentation device being grasped by the guided person. The direction presentation apparatus 100 receives the data via a communicating unit (not illustrated) and inputs the data to the second angle calculating unit 120. As the data related to the force sense presentation device that presents the guided person with the predetermined direction, a direction angle of the force sense presentation device in the external coordinate system can be used, in which case the direction angle can be adopted as the second angle.

In S150, with the first angle calculated in S110 and the second angle calculated in S120 as input, the instructed direction calculating unit 150 uses the first angle and the second angle to calculate an instructed force sense vector (hereinafter, referred to as a second instructed force sense vector) in a force sense presentation device coordinate system representing a direction to be instructed to the force sense presentation device from an instructed force sense vector (hereinafter, referred to as a first instructed force sense vector) in a camera coordinate system representing the direction to be instructed to the force sense presentation device and outputs the calculated instructed force sense vector. In this case, the first instructed force sense vector is designated by a guide at a remote location or a program and corresponds to a direction in which walking of the guided person is to be guided or a direction in which attention of the guided person is to be attracted (in other words, the predetermined direction). Hereinafter, a calculation procedure will be described with $\theta_c^w$ denoting the first angle, $\theta_d^w$ denoting the second angle, $f^c$ denoting the first instructed force sense vector, and $f^d$ denoting the second instructed force sense vector. First, using the first angle $\theta_c^w$ and the second angle $\theta_d^w$, the instructed direction calculating unit 150 obtains a relative angle $\theta_d^c$ in the camera coordinate system representing a relative orientation of the force sense presentation device with respect to an orientation of the camera by the following equation.

[Math. 1]

$$\theta_d^c = \eta_d^w - \theta_c^w \quad (1)$$

Next, using a rotation matrix $^dP_c$ that is defined using the relative angle $\theta_d^c$, the instructed direction calculating unit 150 obtains the second instructed force sense vector $f^d$ from the first instructed force sense vector $f^c$ by the following equations.

[Math. 2]

$$f^d = {}^d P_c \cdot f^c$$

$$^dP_c = \begin{bmatrix} \cos\theta_d^c & \sin\theta_d^c \\ -\sin\theta_d^c & \cos\theta_d^c \end{bmatrix}$$

(Modification)

While the first instructed force sense vector $f^c$ is designated by the guide or a program in the description given above, the instructed direction calculating unit 150 may designate an instructed angle $\theta_i^c$ (hereinafter, referred to as a first instructed angle) in the camera coordinate system representing a direction to be instructed to the force sense presentation device instead of the first instructed force sense vector $f^c$. Hereinafter, a calculation procedure in this case will be described. First, using the first angle $\theta_c^w$ and the second angle $\theta_d^w$, the instructed direction calculating unit 150 obtains a relative angle $\theta_d^c$ in the camera coordinate system representing a relative orientation of the force sense presentation device with respect to an orientation of the camera by equation (1). Next, using the relative angle $\theta_d^c$, the instructed direction calculating unit 150 obtains an instructed angle $\theta_f d$ (hereinafter, referred to as a second instructed angle) in a force sense coordinate system representing the direction to be instructed to the force sense presentation device from the first instructed angle $\theta_i^c$ by the following equation.

[Math. 3]

$$\theta_f^d = \theta_i^c - \theta_d^{c'}$$

In other words, in S150, with the first angle calculated in S110 and the second angle calculated in S120 as input, the instructed direction calculating unit 150 uses the first angle and the second angle to calculate an instructed angle (the second instructed angle) in the force sense presentation device coordinate system representing a direction to be instructed to the force sense presentation device from an instructed angle (a first instructed angle) in the camera coordinate system representing the direction to be instructed to the force sense presentation device and outputs the calculated instructed angle.

It should be noted that an instructed force sense vector and an instructed angle will be referred to as an instructed direction.

Finally, the direction presentation apparatus 100 transmits the instructed direction (the second instructed force sense vector $f^d$ or the second instructed angle $\theta_f^d$) to the force sense presentation device via a communicating unit (not illustrated), and the force sense presentation device presents the guided person with a predetermined direction using a force sense or a stimulus that causes the force sense to be perceived in a simulated manner based on the received instructed direction. While a magnitude of the force sense must be separately provided when using the second instructed angle $\theta_f^d$ as the instructed direction, for example, a magnitude determined in advance may be used.

According to the embodiment of the present invention, a guided person can be presented with a direction in consideration of a relative orientation of a force sense presentation device with respect to an orientation of a camera.

Second Embodiment

A direction presentation apparatus 200 is an apparatus for presenting a guided person with a predetermined direction in real-time and is operated by a guide. In this case, the predetermined direction refers to a direction in which walking of the guided person is to be guided or a direction in which attention of the guided person is to be directed.

Figure 5:
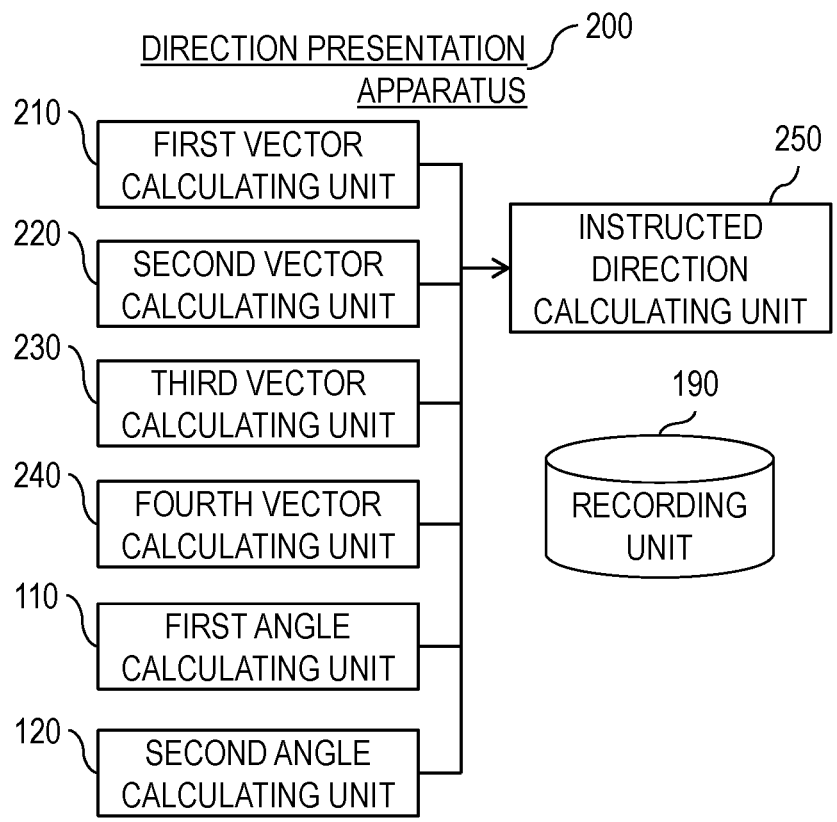
FIG. 5 is a block diagram showing an example of a configuration of a direction presentation apparatus 200.
Figure 6:
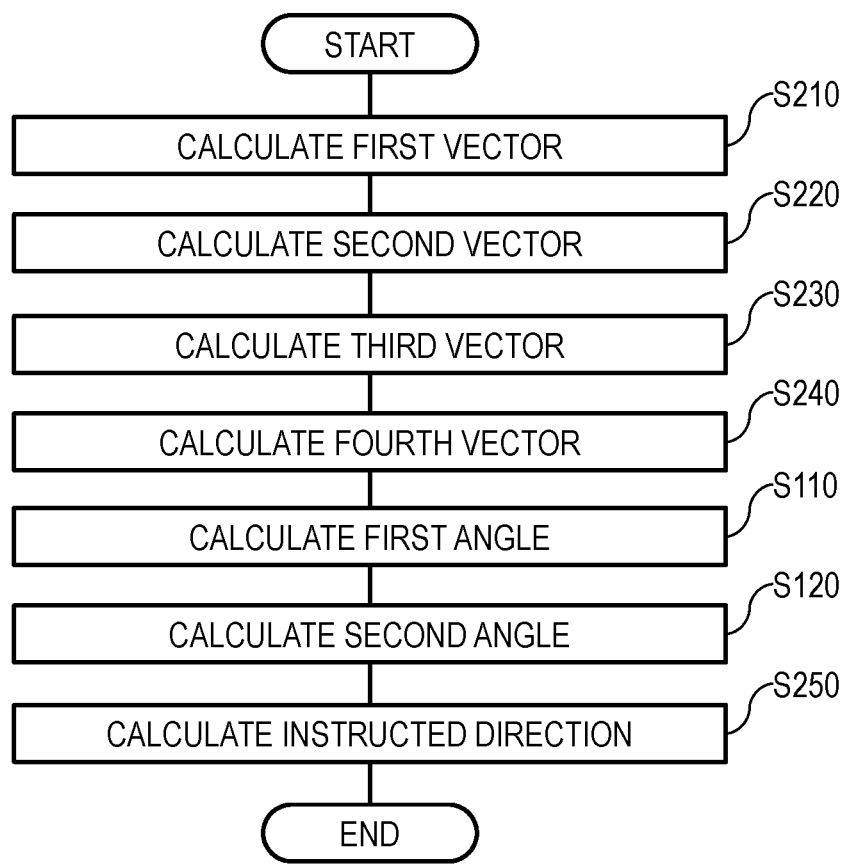
FIG. 6 is a flow chart showing an example of operations of the direction presentation apparatus 200.

Hereinafter, the direction presentation apparatus 200 will be described with reference to FIGS. 5 and 6. FIG. 5 is a block diagram showing a configuration of the direction presentation apparatus 200. FIG. 6 is a flow chart showing operations of the direction presentation apparatus 200. As shown in FIG. 5, the direction presentation apparatus 200 includes a first vector calculating unit 210, a second vector calculating unit 220, a third vector calculating unit 230, a fourth vector calculating unit 240, a first angle calculating unit 110, a second angle calculating unit 120, an instructed direction calculating unit 250, and a recording unit 190. The recording unit 190 is a constituent unit that records information necessary for processing by the direction presentation apparatus 200 when appropriate.

Hereinafter, operations of the direction presentation apparatus 200 will be described with reference to FIG. 6. In S210, using data acquired by a first azimuth sensor that measures a first azimuth in an external coordinate system as input, the first vector calculating unit 210 calculates a first vector that is an azimuth vector in a camera coordinate system that corresponds to the first azimuth and outputs the first vector. In this case, the first azimuth sensor that measures the first azimuth in the external coordinate system is, for example, a geomagnetic sensor, and the first vector in this case is a geomagnetic vector in the camera coordinate system representing a geomagnetic direction. The direction presentation apparatus 200 that is situated at a different point from the guided person receives the data acquired by the first azimuth sensor via a communicating unit (not illustrated) and inputs the data to the first vector calculating unit 210.

In S220, using data acquired by a second azimuth sensor that measures a second azimuth in the external coordinate system as input, the second vector calculating unit 220 calculates a second vector that is an azimuth vector in a force sense presentation device coordinate system that corresponds to the second azimuth and outputs the second vector. In this case, the predetermined direction refers to a direction in which walking of the guided person is to be guided or a direction in which attention of the guided person is to be attracted. In addition, the second azimuth sensor that measures the second azimuth in the external coordinate system is, for example, a geomagnetic sensor, and the second vector in this case is a geomagnetic vector in the force sense presentation device coordinate system representing a geomagnetic direction. The direction presentation apparatus 200 receives the data acquired by the second azimuth sensor via a communicating unit (not illustrated) and inputs the data to the second vector calculating unit 220.

In S230, using data related to an orientation of gravitational force that acts on the camera as input, the third vector calculating unit 230 calculates a third vector in the camera coordinate system representing the orientation of the gravitational force that acts on the camera from the data and outputs the third vector. In this case, the data related to the orientation of the gravitational force that acts on the camera is, for example, data acquired using a gravity sensor (or an acceleration sensor) that is attached to a camera of a smartphone being carried by the guided person, and the direction presentation apparatus 200 receives the data via the communicating unit (not illustrated) and inputs the data to the third vector calculating unit 230.

In S240, using data related to an orientation of gravitational force that acts on the force sense presentation device as input, the fourth vector calculating unit 240 calculates a fourth vector in the force sense presentation device coordinate system representing an orientation of the gravitational force that acts on the force sense presentation device from the data and outputs the fourth vector. In this case, the data related to the orientation of the gravitational force that acts on the force sense presentation device is, for example, data acquired using a gravity sensor (or an acceleration sensor) that is attached to the force sense presentation device being grasped by the guided person, and the direction presentation apparatus 200 receives the data via the communicating unit (not illustrated) and inputs the data to the fourth vector calculating unit 240.

In S110, using data related to an orientation of the camera as input, the first angle calculating unit 110 calculates a first angle in the external coordinate system that represents the orientation of the camera from the data and outputs the first angle.

In S120, using data related to an orientation of the force sense presentation device as input, the second angle calculating unit 120 calculates a second angle in the external coordinate system that represents the orientation of the force sense presentation device from the data and outputs the second angle.

In S250, with the first vector calculated in S210, the second vector calculated in S220, the third vector calculated in S230, the fourth vector calculated in S240, the first angle calculated in S110, and the second angle calculated in S120 as input, the instructed direction calculating unit 250 uses the first vector, the second vector, the third vector, the fourth vector, the first angle, and the second angle to calculate an instructed force sense vector (hereinafter, referred to as a second instructed force sense vector) in the force sense presentation device coordinate system representing a direction to be instructed to the force sense presentation device from an instructed force sense vector (hereinafter, referred to as a first instructed force sense vector) in the camera coordinate system representing the direction to be instructed to the force sense presentation device and outputs the calculated instructed force sense vector. In this case, the first instructed force sense vector is designated by a guide at a remote location or a program and corresponds to a direction in which walking of the guided person is to be guided or a direction in which attention of the guided person is to be attracted (in other words, the predetermined direction). Hereinafter, a calculation procedure will be described with $\theta_c^w$ denoting the first angle, $\theta_d^w$ denoting the second angle, $f^c$ denoting the first instructed force sense vector, and $f^d$ denoting the second instructed force sense vector. First, the instructed direction calculating unit 250 determines whether or not a difference between a magnitude of the third vector and a magnitude of a reference vector is within a predetermined range indicating that the difference is small. In this case, the difference being within a predetermined range indicating that the difference is small refers to the difference being smaller than a predetermined threshold or the difference being equal to or smaller than the predetermined threshold. In addition, the reference vector is, for example, the third vector in a static state and is a vector used as a reference when measuring a change in acceleration based on the third vector. Alternatively, the fourth vector may be used instead of the third vector.

In addition, the instructed direction calculating unit 250 determines whether or not a difference between a magnitude of the fourth vector and a magnitude of a reference vector is within a predetermined range indicating that the difference is small. In this case, the reference vector is, for example, the fourth vector in a static state and is a vector used as a reference when measuring a change in acceleration based on the fourth vector.

Such determination processing is necessary because, when the guided person is engaged in a movement that causes a change in acceleration, the data related to an orientation of gravitational force that acts on the camera and the data related to an orientation of gravitational force that acts on the force sense presentation device cannot be used as-is to calculate the third vector and the fourth vector. Therefore, the threshold described above is a value that is allowable as a difference in magnitudes of acceleration (in other words, an amount of change in acceleration).

Hereinafter, the difference between the magnitude of the third vector and the magnitude of the reference vector thereof will be referred to as an amount of change in acceleration based on the third vector, and the difference between the magnitude of the fourth vector and the magnitude of the reference vector thereof will be referred to as an amount of change in acceleration based on the fourth vector.

When the amounts of change in acceleration based on the third vector and the fourth vector are within a predetermined range indicating that the amounts of change in acceleration are small, the instructed direction calculating unit 250 executes the following processing steps.

(1) First, using the first vector and the third vector, the instructed direction calculating unit 250 obtains a compound matrix $r^c$ constructed from three vectors, namely, the first vector, the third vector, and a cross product vector of the first vector and the third vector. In a similar manner, using the second vector and the fourth vector, the instructed direction calculating unit 250 obtains a compound matrix $r^d$ constructed from three vectors, namely, the second vector, the fourth vector, and a cross product vector of the second vector and the fourth vector.

(2) Next, using a rotation matrix $^dR_c$ defined using the compound matrix $r^c$ and the compound matrix $r^d$, the instructed direction calculating unit 250 obtains the second instructed force sense vector $f^d$ from the first instructed force sense vector $f^c$ by the following equations.

[Math. 4]

$$^dR_c = r^d \cdot (r^c)^{-1}$$

$$f^d = {^dR_c} f^c$$

On the other hand, when the amounts of change in acceleration based on the third vector and the fourth vector are not within the predetermined range indicating that the amounts of change in acceleration are small, the instructed direction calculating unit 250 executes the following processing steps.

(1) First, using the first angle $\theta_c^w$ and the second angle $\theta_d^w$, the instructed direction calculating unit 250 obtains a relative angle $\theta_d^c$ in the camera coordinate system representing the relative orientation of the force sense presentation device with respect to the orientation of the camera by the following equation.

[Math. 5]

$$\theta_d^c = \eta_d^w - \theta_c^w \quad (1)$$

(2) Next, using a rotation matrix $^dP_c$ defined using the relative angle $\theta_d^c$, the instructed direction calculating unit 250 obtains the second instructed force sense vector $f^d$ from the first instructed force sense vector $f^c$ by the following equations.

$$f^d = {^dP_c} \cdot f^c \quad \text{[Math. 6]}$$

$$^dP_c = \begin{bmatrix} \cos\theta_d^c & \sin\theta_d^c \\ -\sin\theta_d^c & \cos\theta_d^c \end{bmatrix}$$

It should be noted that an instructed force sense vector will be referred to as an instructed direction.

Finally, the direction presentation apparatus 200 transmits the instructed direction (the second instructed force sense vector $f^d$) to the force sense presentation device via a communicating unit (not illustrated), and the force sense presentation device presents the guided person with a predetermined direction using a force sense or a stimulus that causes the force sense to be perceived in a simulated manner based on the received instructed direction.

It is needless to say that the processing steps of the instructed direction calculating unit 250 when the amounts of change in acceleration based on the third vector and the fourth vector are not within the predetermined range indicating that the amounts of change in acceleration are small may be executed as same processing steps as the processing steps of the instructed direction calculating unit 150 described in the modification of the first embodiment.

According to the embodiment of the present invention, a guided person can be presented with a direction in consideration of a relative orientation of a force sense presentation device with respect to an orientation of a camera.

<Addendum>

Figure 7:
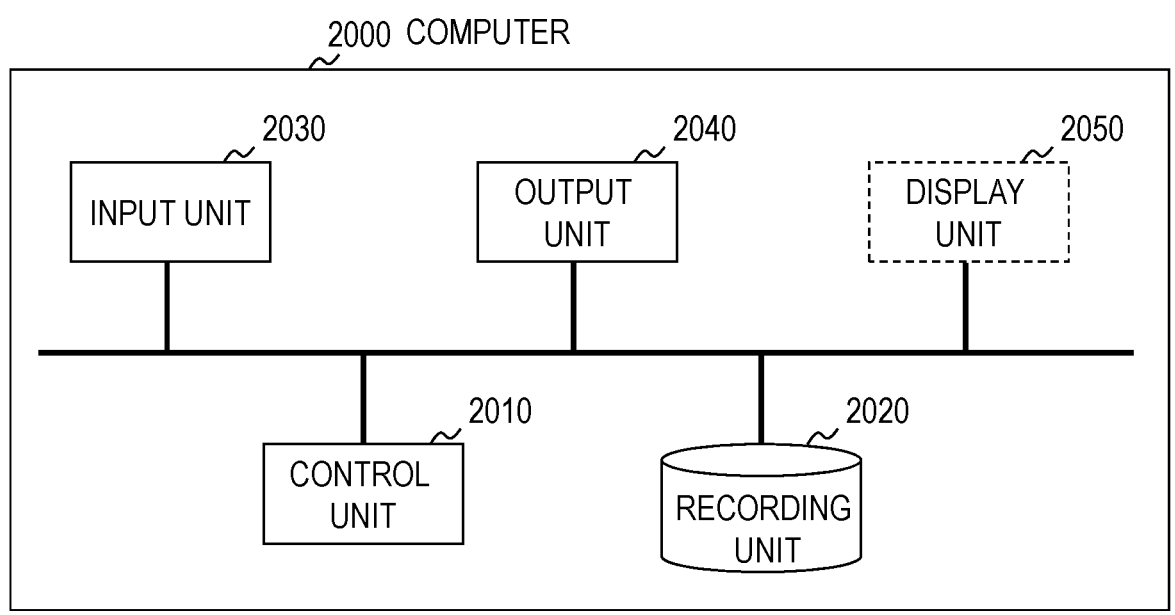
FIG. 7 is a diagram showing an example of a functional configuration of a computer that realizes respective apparatuses according to an embodiment of the present invention.

FIG. 7 is a diagram showing an example of a functional configuration of a computer that realizes the respective apparatuses described above. The processing steps in the respective apparatuses described above can be performed by having a recording unit 2020 read a program that causes a computer to function as the respective apparatuses described above and causing a control unit 2010, an input unit 2030, an output unit 2040, and the like to perform operations.

For example, as a single hardware entity, the apparatus according to the present invention has: an input unit to which a keyboard or the like can be connected; an output unit to which a liquid crystal display or the like can be connected; a communication unit to which a communication apparatus (such as a communication cable) that is capable of communicating with the outside of the hardware entity can be connected; a CPU (Central Processing Unit which may be provided with a cache memory, a register, or the like); a RAM and a ROM that are memories; an external storage apparatus that is a hard disk; and a bus that connects the input unit, the output unit, the communication unit, the CPU, the RAM, the ROM, and the external storage apparatus so as to be capable of exchanging data. In addition, the hardware entity may be provided with an apparatus (a drive) that is capable of reading from and writing into a recording medium such as a CD-ROM. Examples of a physical entity provided with such a hardware resource include a general-purpose computer.

The external storage apparatus of the hardware entity stores programs necessary for realizing the functions described above, data required during processing of the programs, and the like (besides the external storage apparatus, for example, the programs may be stored in a ROM that is a read-only storage apparatus). In addition, data or the like obtained by the processing of the programs is appropriately stored in the RAM, the external storage apparatus, or the like.

In the hardware entity, each program and data necessary for processing of the program which are stored in the external storage apparatus (or the ROM or the like) are loaded to a memory when necessary to be appropriately interpreted, executed, and processed by the CPU. As a result, the CPU realizes a predetermined function (each component represented as a unit, means, or the like in the description presented above).

The present invention is not limited to the embodiments described above and various modifications can be made without departing from the spirit and scope of the present invention. In addition, the processing steps explained in the embodiments described above may not only be executed in chronological order according to the descriptions but may also be executed in parallel or on an individual basis in accordance with processing capabilities of an apparatus to be used to execute the processing steps or as may be necessary.

As already described, when realizing the processing functions of the hardware entity (the apparatus according to the present invention) explained in the embodiment described above with a computer, processing contents of functions which the hardware entity must be equipped with are described by a program. In addition, the processing functions of the hardware entity described above are realized on the computer by having the computer execute the program.

The program describing the processing contents can be recorded in a computer-readable recording medium. Any computer-readable recording medium may be used such as a magnetic recording apparatus, an optical disk, a magneto-optical recording medium, and a semiconductor memory. Specifically, for example, a hard disk apparatus, a flexible disk, a magnetic tape, or the like can be used as a magnetic recording apparatus, a DVD (Digital Versatile Disc), a DVD-RAM (Random Access Memory), a CD-ROM (Compact Disc Read Only Memory), a CD-R (Recordable)/RW (ReWritable) or the like can be used as an optical disk, an MO (Magneto-Optical disc) or the like can be used as a magneto optical recording medium, and an EEP-ROM (Electronically Erasable and Programmable-Read Only Memory) or the like can be used as a semiconductor memory.

In addition, the program is distributed by, for example, selling, transferring, or lending a portable recording medium such as a DVD or a CD-ROM on which the program is recorded. Furthermore, a configuration may be adopted in which the program is stored in a storage apparatus of a server computer and the server computer transmits the program to other computers via network in order to distribute the program.

For example, a computer that executes such a program first temporarily stores the program recorded in a portable recording medium or the program transmitted from a server computer in its own storage apparatus. In addition, when executing processing, the computer reads the program stored in its own storage apparatus and executes processing in accordance with the read program. Furthermore, as an alternative execution mode of the program, a computer may read a program directly from a portable recording medium and execute processing in accordance with the program or, every time the program is transmitted from a server computer to the computer, the computer may sequentially execute processing in accordance with the received program. In addition, a configuration may be adopted in which a program is not transmitted to the computer from a server computer but the processing described above is executed by a so-called ASP (Application Service Provider) type service which realizes a processing function only by issuing an execution instruction and acquiring a result thereof. It should be noted that the program according to the present mode includes information which is to be processed by an electronic computer and which is equivalent to a program (data or the like which is not a direct command intended for a computer but which has a property of specifying processing by the computer).

In addition, in the mode, while the hardware entity is configured by having a computer execute a predetermined program, at least a part of processing contents thereof may be realized by hardware.

The foregoing description of embodiments of the present invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the present invention and its practical application, and to thereby enable one of ordinary skill in the art to utilize the present invention in various embodiments and with various modifications as are suited to the particular use contemplated. All such modifications and variations are within the scope of the present invention as determined by the appended claims when interpreted in accordance with the breadth to which they are fairly, legally, and equitably entitled.

The invention claimed is:

1. A direction presentation apparatus, comprising circuitry configured to:
   calculate, using a first angle and a second angle, a second instructed force sense vector from a first instructed force sense vector,
   wherein
   the first angle is in an external coordinate system and represents an orientation of a camera that takes an image in front of a guided person,
   the second angle is in the external coordinate system and represents an orientation of a force sense presentation device that presents the guided person with a predetermined direction,
   the external coordinates refer to coordinates capable of representing north, south, east and west,
   the second instructed force sense vector represents a vector representing a direction input to the force sense presentation device in a force sense presentation device coordinate system,
   the first instructed force sense vector represents a vector corresponding to the predetermined direction in a camera coordinate system,
   the force sense presentation device coordinates refer to coordinates capable of representing the direction with respect to the force sense presentation device's orientation, and
   the camera coordinates refer to coordinates capable of representing the direction with respect to the camera's orientation.

2. The direction presentation apparatus according to claim 1, wherein
   when $\theta_c^w$ denotes the first angle, $\theta_d^w$ denotes the second angle, $f^c$ denotes the first instructed force sense vector, and $f^d$ denotes the second instructed force sense vector,
   the circuitry further configured to calculate the second instructed force sense vector $f^d$ by the following equations $$f^d = {}^d P_c \cdot f^c$$
$$^d P_c = \begin{bmatrix} \cos\theta_d^c & \sin\theta_d^c \\ -\sin\theta_d^c & \cos\theta_d^c \end{bmatrix}$$
$$\theta_d^c = \theta_d^w - \theta_c^w.$$

3. A direction presentation apparatus, comprising circuitry configured to:
   calculate a second instructed force sense vector from a first instructed force sense vector, using a first vector, a second vector, a third vector, a fourth vector, a first angle, and a second angle, wherein
   the first vector represents an azimuth vector in a camera coordinate system and corresponds to a first azimuth in an external coordinate system,
   the camera coordinates refer to coordinates capable of representing the direction with respect to the camera's orientation, the external coordinates refer to coordinates capable of representing north, south, east and west, the second vector represents an azimuth vector in a force sense presentation device coordinate system and corresponds to a second azimuth in the external coordinate system, the force sense presentation device coordinates refer to coordinates capable of representing the direction with respect to the force sense presentation device's orientation, the third vector is in the camera coordinate system and represents an orientation of gravitational force being applied to the camera, the fourth vector is in the force sense presentation device coordinate system and represents an orientation of gravitational force being applied to the force sense presentation device, the first angle is in the external coordinate system and represents an orientation of the camera, the second angle is in the external coordinate system and represents an orientation of the force sense presentation device, the second instructed force sense vector represents a vector representing a direction input to the force sense presentation device in the force sense presentation device coordinate system, and the first instructed force sense vector represents a vector corresponding to a predetermined direction presented to a guided person in the camera coordinate system.

4. The direction presentation apparatus according to claim 3, wherein when $r^c$ denotes a compound matrix constructed from the first vector, the third vector, and a cross product vector of the first vector and the third vector, $r^d$ denotes a compound matrix constructed from the second vector, the fourth vector, and a cross product vector of the second vector and the fourth vector, $\theta_c^w$ denotes the first angle, $\theta_d^w$ denotes the second angle, $f^c$ denotes the first instructed force sense vector, and $f^d$ denotes the second instructed force sense vector, the circuitry further configured to calculate the second instructed force sense vector $f^d$ by the following equations when amounts of change in acceleration based on the third vector and the fourth vector are within a predetermined range indicating that the amounts of change in acceleration are small $$^dR_c = r^d \cdot (r^c)^{-1}$$

$$f^d = {}^dR_c f^c,$$

but otherwise the circuitry is further configured to calculate the second instructed force sense vector $f^d$ by the following equations $$f^d = {}^dP_c \cdot f^c$$

$$^dP_c = \begin{bmatrix} \cos\theta_d^c & \sin\theta_d^c \\ -\sin\theta_d^c & \cos\theta_d^c \end{bmatrix}$$

$$\theta_d^c = \theta_d^w - \theta_c^w.$$

5. A direction presentation method, comprising:

an instructed direction calculating step of calculating a second instructed force sense vector from a first instructed force sense vector, using a first angle and a second angle, wherein the first angle is in an external coordinate system and represents an orientation of a camera that takes an image in front of a guided person, the second angle is in the external coordinate system and represents an orientation of a force sense presentation device that presents the guided person with a predetermined direction, the external coordinates refer to coordinates capable of representing north, south, east and west, the second instructed force sense vector represents a vector representing a direction input to the force sense presentation device in a force sense presentation device coordinate system, the first instructed force sense vector represents a vector corresponding to the predetermined direction in a camera coordinate system, the force sense presentation device coordinates refer to coordinates capable of representing the direction with respect to the force sense presentation device's orientation, and the camera coordinates refer to coordinates capable of representing the direction with respect to the camera's orientation.

6. A direction presentation method, comprising:

an instructed direction calculating step of calculating a second instructed force sense vector from a first instructed force sense vector, using a first vector, a second vector, a third vector, a fourth vector, a first angle, and a second angle, wherein the first vector represents an azimuth vector in a camera coordinate system and corresponds to a first azimuth in an external coordinate system, the camera coordinates refer to coordinates capable of representing the direction with respect to the camera's orientation, the external coordinates refer to coordinates capable of representing north, south, east and west, the second vector represents an azimuth vector in a force sense presentation device coordinate system and corresponds to a second azimuth in the external coordinate system, the force sense presentation device coordinates refer to coordinates capable of representing the direction with respect to the force sense presentation device's orientation, the third vector is in the camera coordinate system and represents an orientation of gravitational force being applied to the camera, the fourth vector is in the force sense presentation device coordinate system and represents an orientation of gravitational force being applied to the force sense presentation device, the first angle is in the external coordinate system and represents an orientation of the camera, the second angle is in the external coordinate system and represents an orientation of the force sense presentation device, the second instructed force sense vector represents a vector representing a direction input to the force sense presentation device in the force sense presentation device coordinate system, and the first instructed force sense vector represents a vector corresponding to a predetermined direction presented to a guided person in the camera coordinate.

7. A non-transitory computer-readable storage medium which stores a program for causing a computer to function as the direction presentation apparatus according to claim 1.

8. A non-transitory computer-readable storage medium which stores a program for causing a computer to function as the direction presentation apparatus according to claim 3.

* * * * *